Patented Sept. 28, 1954

2,690,410

UNITED STATES PATENT OFFICE 2,690,410

LAMINATING ADHESIVE FOR SAFETY GLASS

Joseph S. Nelson, Longmeadow, Mass., assignor to Monsanto Chemical Company, St. Louis, Mo., a corporation of Delaware No Drawing. Application May 7, 1953, Serial No. 353,672

4 Claims. (Cl. 154—2.77)

This invention relates to polyvinyl butyral adhesive sheets for use in preparing laminated glass. More particularly the invention relates to improved polyvinyl butyral compositions and to laminated glass prepared therewith.

One of the major uses for polyvinyl butyral resins is in the preparation of laminated glass especially for safety glass in automobiles. The resins are generally plasticized and then formed into sheets which are then laminated between sheets of glass. Laminated glass made therewith is effective under a wide variety of atmospheric conditions and provides a large measure of safety to the automotive public.

One difficulty with the use of the polyvinyl butyral resins in the laminated glass is the tendency for the laminate to separate at the edges thereof causing a gradual deterioration of the safety features which make it so valuable. The problem has been attacked in many ways with the greatest success being the sealing of the edges with an adhesive other than the polyvinyl butyral. This sealing entails an extra operation which adds to the cost of the laminates.

One object of this invention is to improve glass laminates made with polyvinyl butyral resins as the adhesive lamina.

A further object is to improve polyvinyl butyral resins to make their use in laminated glass more effective.

Still another object is to modify polyvinyl butyral resins for use in laminated glass.

These and other objects are attained by incorporating a small amount of oxalic acid in a plasticized polyvinyl butyral resin.

The following examples are given in illustration and are not intended as limitations on the scope of this invention. Where parts are mentioned they are parts by weight.

Example I

Use a polyvinyl butyral resin containing about 18% hydroxyl groups calculated as polyvinyl alcohol and about 3% ester groups calculated as polyvinyl acetate with the remainder being butyraldehyde acetal groups. Mix 100 parts of this polyvinyl butyral resin with 40 parts of dibutyl Cellosolve adipate and 0.1 part of oxalic acid. Extrude the mix into sheets about 0.015" thick and laminate the sheets between two pieces of glass under heat and pressure. A good laminate will show complete adherence of the glass to the resin sheet out to the very edge of the laminate. Expose the laminate to normal weather conditions in southern Florida for one year. Examine the laminates critically for separation between the glass and plastic at intervals during the year. At the end of a year, substantially no edge separation will be found.

Example II

Mix 100 parts of the same resin used in Example I and 40 parts of dibutyl Cellosolve adipate taken from the same batch as the plasticizer in Example I. Extrude this mixture into 0.015" sheets and laminate the sheets to glass under the same conditions as used in Example I. On exposure to normal weather in southern Florida it will be found that edge separation begins to appear within six months and at the end of the year a relatively large number of such separations can be observed.

Example III

Mix together 100 parts of a polyvinyl butyral resin containing about 20% hydroxyl groups and substantially no ester groups with 40 parts of dibutyl Cellosolve adipate. Divide the mixture into three equal portions. To one portion, add 0.05 part of oxalic acid, to the second add 0.1 part of oxalic acid and to the third add 0.5 part of oxalic acid, all based on 100 parts of resin in the portion. Extrude the portions separately into 0.015" sheets under substantially the same conditions and then laminate them between sheets of glass under substantially the same conditions. Expose the various laminates to normal weathering in southern Florida. It will be found that the laminates containing 0.05 part of oxalic acid may show one or two edge separations at the end of the year, and that the laminates containing 0.1 and 0.5 part of oxalic acid show no edge separations at the end of the year.

Test unweathered laminates made from the three portions by the standard ball dropping test used in the laminated glass industry. It will be found that the samples containing 0.05 and 0.1 part of oxalic acid are fully as good as laminates made from resin containing no oxalic acid but that the laminate made with the portion containing 0.5 part of oxalic acid does not have as good low temperature strength. The laminates prepared with a resin containing 0.5 part of oxalic acid may be improved by conducting the lamination step at slightly higher temperatures than normally used in the laminated glass industry.

Example IV

Use a polyvinyl butyral resin having a hydroxyl content of about 17% calculated as polyvinyl alcohol and an ester content of about 3% calculated as polyvinyl acetate with the remainder of the groups being butyraldehyde acetal groups. Mix 100 parts of the polyvinyl butyral resin with 40 parts of triethylene glycol di(2-ethyl butyrate) and 0.1 part of oxalic acid. Extrude the mixture into 0.015″ sheets and laminate the sheets between two pieces of glass. It will be found that no edge separation is observable after a year's exposure to normal weather conditions in southern Florida or after extended exposure to accelerated weathering conditions in a weatherometer. The laminates before ageing have strength and adhesion properties equivalent to laminates made from unmodified polyvinyl butyral resins plasticized with the same plasticizer.

*Example V*

Use a polyvinyl butyral resin containing about 19% hydroxyl groups calculated as polyvinyl alcohol and about 1.5% ester groups calculated as polyvinyl acetate with the remainder of the groups being butyraldehyde acetal groups. Mix 100 parts of the polyvinyl butyral resin with 40 parts of dibutyl sebacate and 0.1 part of oxalic acid. Extrude the mixture into 0.015″ sheets and laminate the sheets between two glass plates. The laminates will have all the benefits of polyvinyl butyral resins containing no oxalic acid with the additional advantage that substantially no edge separation will occur in weathering tests or in actual use.

The polyvinyl butyral resins of this invention are generally prepared by hydrolysis of a polyvinyl ester, particularly polyvinyl acetate, followed by the reaction of the hydrolyzed product with butyraldehyde. For use in laminated glass, it is preferred that the resin contain about 17–22% hydroxyl groups calculated as polyvinyl alcohol and from 0–3% ester groups calculated as polyvinyl acetate. The remainder of the terminal groups of the resin are butyraldehyde acetal groups.

To be effective in laminated glass under a wide variety of weather conditions, the polyvinyl butyral resins should be plasticized with from 40 to 50 parts of plasticizer per 100 parts of resin. The plasticizers most generally used in the laminated glass industry are dibutyl sebacate, triethylene glycol di(2-ethyl butyrate) and dibutyl Cellosolve adipate. Other ester plasticizers may be used where special effects are desired.

Oxalic acid appears to be specific in its action in retarding edge separation of laminates. Other dicarboxylic acids show relatively little improvement in this regard and the esters of oxalic acid are substantially ineffective. The amount of oxalic acid may be varied from 0.05 to 0.5 part per 100 parts of resin. At 0.05 part the first substantial improvement of the laminates is noted. At 0.1 part the prevention of edge separation is substantially 100% effective. Above 0.1 part higher temperatures are required to obtain good quality laminates and above 0.5 part there is a tendency to discoloration on exposure to the weather.

The mixing operation may be a mere blending of the resin and oxalic acid in pulverulent form with the liquid plasticizer or it may be a vigorous malaxation of the three ingredients as in a Banbury mixer or on mill rolls at elevated temperatures. After thorough homogenization of the ingredients the mixture is formed into a sheet of sufficient thickness to form a strong laminate. This is preferably accomplished by extrusion of the mixture through a proper die. The mixture may be extruded without modification or it may be dissolved in an appropriate solvent with the solvent being removed from the sheet after it is formed. For automotive use, the sheets should be about 0.015″ thick but the thickness may be considerably greater for other laminates such as those used in bullet proof glass.

After the sheets are formed they are laminated to glass under heat and pressure. Normal operating conditions are at about 275° F. and 130 p. s. i. For sheets containing the larger amount of oxalic acid it is generally necessary to increase the temperature during the laminating operation by from 15 to 25° F. in order to obtain laminates having optimum impact strength and adhesion of the glass to the resin.

For most laminated glass uses, the laminate is made of a plurality of sheets of glass with each sheet being separated from the adjacent sheet and adhesively secured thereto by a sheet of the resin. For some applications, only one sheet of glass will be used and the second sheet of glass is replaced by a relatively hard synthetic resin such as a polymethyl methacrylate sheet.

The modification of the polyvinyl butyral resin with oxalic acid according to this invention makes it possible to eliminate edge separation of laminates prepared therewith without sacrificing impact strength of the laminates or adhesion of the glass to the resin interlayer.

What is claimed is:

1. A plasticized polyvinyl butyral resin containing from 0.05 to 0.5 part of oxalic acid per 100 parts of resin.

2. A plasticized polyvinyl butyral resin containing 0.1 part of oxalic acid per 100 parts of resin.

3. Laminated glass comprising a plurality of sheets of glass, each sheet of which is separated from the adjacent sheet of glass and adhesively secured thereto by a sheet of a plasticized polyvinyl butyral resin containing from 0.05 to 0.5 part of oxalic acid per 100 parts of resin.

4. Laminated glass comprising two sheets of glass separated by and adhesively secured to a sheet of plasticized polyvinyl butyral resin containing 0.1 part of oxalic acid per 100 parts of resin.

No references cited.